Sept. 15, 1970  G. R. PERKINS  3,528,277
FLUID ACTUATED RIVET PULLING TOOL FOR BLIND RIVETS
Filed May 8, 1968  3 Sheets-Sheet 1

INVENTOR.
GARRY R. PERKINS
BY
ATTORNEY

Sept. 15, 1970 G. R. PERKINS 3,528,277
FLUID ACTUATED RIVET PULLING TOOL FOR BLIND RIVETS
Filed May 8, 1968 3 Sheets-Sheet 2

INVENTOR.
GARRY R. PERKINS
BY *J. Walter Bach*
ATTORNEY

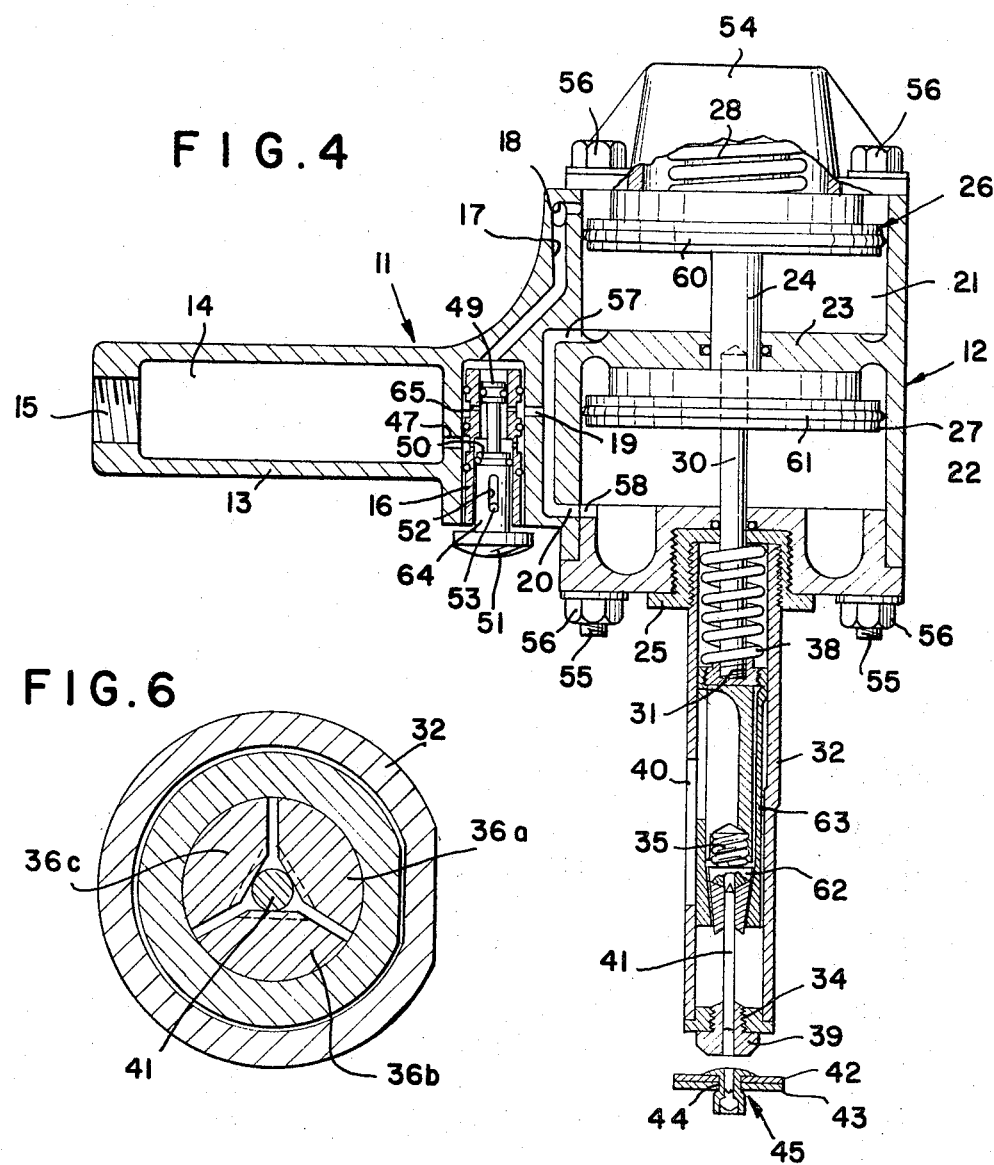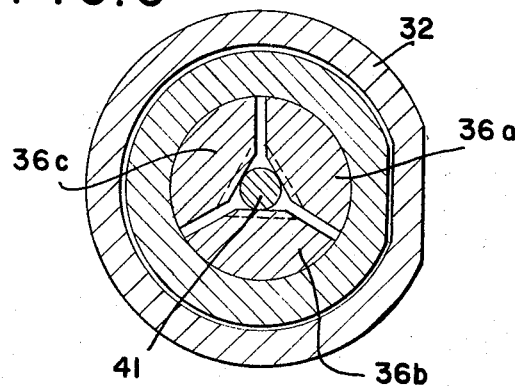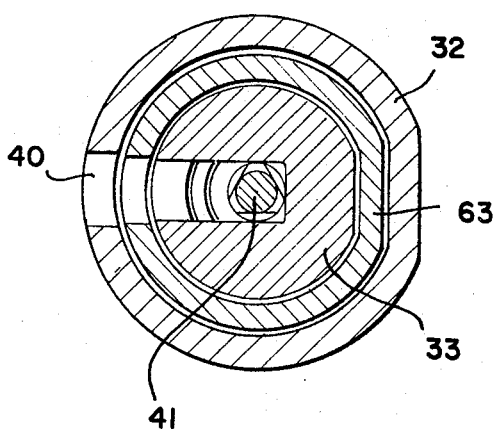

United States Patent Office 3,528,277
Patented Sept. 15, 1970

3,528,277
FLUID ACTUATED RIVET PULLING TOOL FOR BLIND RIVETS
Garry R. Perkins, West Chicago, Ill., assignor to Swingline Inc., Long Island City, N.Y., a corporation of New York
Filed May 8, 1968, Ser. No. 727,440
Int. Cl. B21d 9/05
U.S. Cl. 72—391          4 Claims

ABSTRACT OF THE DISCLOSURE

A fluid actuated rivet pulling tool for blind rivets is shown. The tool includes a housing, a piston sleeve in the housing, and piston means within the housing. The piston means include a projecting support and a pair of spaced spool members upon the support. A fluid conduit is operatively connected with each of the spools of the piston and an additional fluid conduit is provided which is open to atmosphere. A trigger which includes a stem having a pair of spaced spool members thereupon is disposed within a trigger housing. The trigger selectively blocks either the first-named fluid conduit or the additional fluid conduit. The first-named conduits are selectively attached to a source of pressure fluid. A return spring normally biases the piston into non-actuated position. The piston support is secured to a rivet pulling mechanism.

DESCRIPTION OF THE INVENTION

This invention relates to a fluid actuated rivet pulling tool for blind rivets and is particularly designed for that type of blind rivet which is formed with a stem portion and a rivet portion secured thereto. The blind rivet adapted to be driven by the tool of this invention is well known and is described in a number of expired United States patents. In general the blind rivet of this type includes a stem having an enlarged lower portion upon which is disposed the rivet portion to be driven. The rivet portion is placed within an opening and the stem is pulled upwardly. This enlarges the rivet portion on the "wrong" side of the opening and as the pulling force is continued the stem breaks.

In general the pulling of the stem is accomplished by a pair of co-acting spring-loaded jaws which are moved upwardly to accomplish the work.

In order to produce the necessary force to break the stem and set the rivet portion or where a large number of rivets of this type are to be driven and fatigue of the operator must be avoided fluid actuated (preferably pneumatic) rivet pulling tools have been conventionally employed. The tool of this invention constitutes improvements to structures of the above type.

The above constitutes a brief description of this invention and some of the objects and advantages thereof. Other objects and advantages of this invention will become apparent to the reader of this specification as the description proceeds.

The invention will now be further described by reference to the accompanying drawings which are made a part of this specification.

FIG. 4 is a view similar to that of FIG. 3 but with the parts of the tool shown in the position that they assume when the tool is actuated; the rivet portion is enlarged and the stem is broken.

FIG. 6 is a cross-sectional view taken along lines 6—6 of FIG. 3.

FIG. 7 is a cross-sectional view taken along lines 7—7 of FIG. 3.

Figure 2:
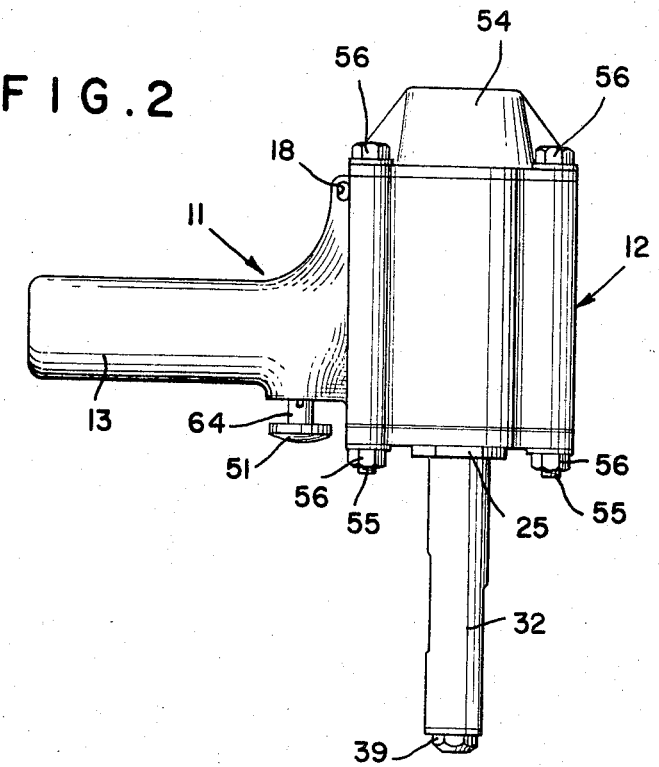
FIG. 2 is a side elevational view of the tool shown in FIG. 1.
Figure 1:
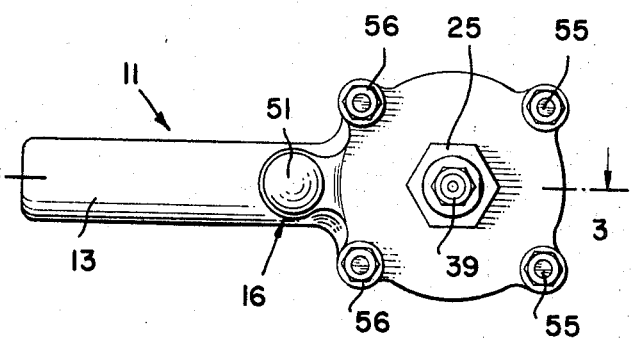
FIG. 1 is a top plan view of a rivet pulling tool made in accordance with this invention.

A detailed description of this invention will now be given by reference to the form thereof as shown in the accompanying drawings. In this connection, however, the reader is cautioned to note that the specific form of this invention shown is for illustrative purposes and for purposes of example only. Various changes and modifications could obviously be made within the spirit and scope of this invention.

The rivet pulling tool 11 of this invention is formed with a housing 12 which includes a handle portion 13. Within handle 13 is an air space 14 and a threaded connecting portion 15 is adapted to connect space 14 to a source of pressure air. A trigger housing 16 is provided between handle 13 and housing 12. Housing 12 includes a top portion 54 which is secured to the remainder of housing 12 by bolts 55 and nuts 56.

Trigger housing 16 is joined to exhaust conduit 17 which in turn communicates with the atmosphere through port 18.

A conduit 19 is also provided which selectively permits pressure air to actuate the spools 26–27 of the piston of this invention. Conduit 19 is joined to conduit 20. Conduit 20 is bifurcated at one end into outlet portions 57 and 58. Outlet portion 57 is connected to opening 21 within housing 12 and outlet portion 58 connected to opening 22 within housing 12. Between openings 21 and 22 is a divider 23.

A piston support 24 is provided which passes through divider 23 and bears sealing ring 59. A first spool 26 is operatively connected to piston support 24 and is sealed within space 21 by sealing ring 60. A second spool 27 is disposed within space 22 and is sealed in position by sealing ring 61. Disposed above spool 26 is a coil spring 28 which normally biases spool 26 and associated parts in the "down" position.

Spring 28 is also disposed upon support 29 which is connected to top portion 54 of housing 12.

Support 24 is connected to stem 30 which bears a threaded end portion 31. Stem 30 is disposed within stem supporting housing 32 which is threadedly connected to support 25 which in turn is threadedly connected to housing 12. Within housing 32 is an additional coil spring 38 which aids in biasing the rivet pulling structure in the "down" position.

Three (3) rivet pull jaws, 36a, 36b and 36c are disposed within housing 32. Jaws 36a–36c are biased downwardly by means of an actuator 62 and a spring 35 overlying actuator 62. A puller member 33 is operatively connected to jaws 36a–36c and bears a threaded portion 63 which is connected to threaded portion 31.

A jam nut 39 bears a threaded portion 34 which is connected to housing 32.

An opening 40 is provided within housing 32 and this opening serves to expel the stem 41 of the blind rivet 45.

The trigger 64 is formed with a button portion 51 which in turn is provided with an opening 52. A pin 53 is disposed within opening 52 and limits the travel of trigger button 51. Trigger button 51 is connected to a stem 48 which bears a spool 49 and a spool 50 of larger diameter than spool 49.

Spool 50 is sealed within trigger housing 16 by O-ring 66 and spool 49 sealed within trigger housing 16 by O-ring 67. It is noted that stem 48, between spools 49 and 50, is of smaller diameter than trigger housing 16.

A conduit 47 is provided within trigger housing 16 and joins space 14 to trigger housing 16. An additional conduit 65 is also provided within trigger housing 16 and joins trigger housing 16 with conduit 19.

With the foregoing specific description the operation of this invention will now be explained.

In the normal rest position of the device pressure air flows from space 14 through conduit 47 and bears against spool 50 of the trigger. Also, in this position, conduit 65 is connected to trigger housing 16 and conduit 17 is joined to conduit 65 of trigger housing 16. Spool 49 seals conduit 65 from conduit 47 and therefore pressure air cannot get into the device. Also pressure air exerts a greater force in the "down" position since spool 50 is larger than spool 49. In this position spool 49 blocks communication between conduit 47 and conduit 65 so that no pressure air can flow into spaces 21 and 22. At the same time spring 28 forces spools 26 and 27 into the "down" position.

A rivet 45 may now be inserted within an opening 44 located within two (2) pieces of material 42 and 43 which are to be fastened. The stem 41 of the rivet 45 is placed within the opening in jam nut 39 and thereby biases jaws 36a–36c outwardly against the pressure of spring 35. Trigger 51 is then pushed upwardly. This moves spool 49 in an upward position and blocks communication between conduit 17 and conduit 65. At the same time the movement upwardly of spool 49 permits pressure air from conduit 47 to flow from conduit 47 through trigger housing 16 through conduit 65, conduit 20, bifurcated portions 57 and 58, and openings 21 and 22. This pressure air exerts an upward force against spools 26 and 27 which is far greater than the downward force exerted by springs 28 and 38. This causes stem 30 to move upwardly and thus carries jaws 36a, 36b and 36c into the position shown in FIG. 4. This movement fractures stem 41 and expands the lower portion of the rivet thereby riveting members 42 and 43 to one another.

Figure 3:
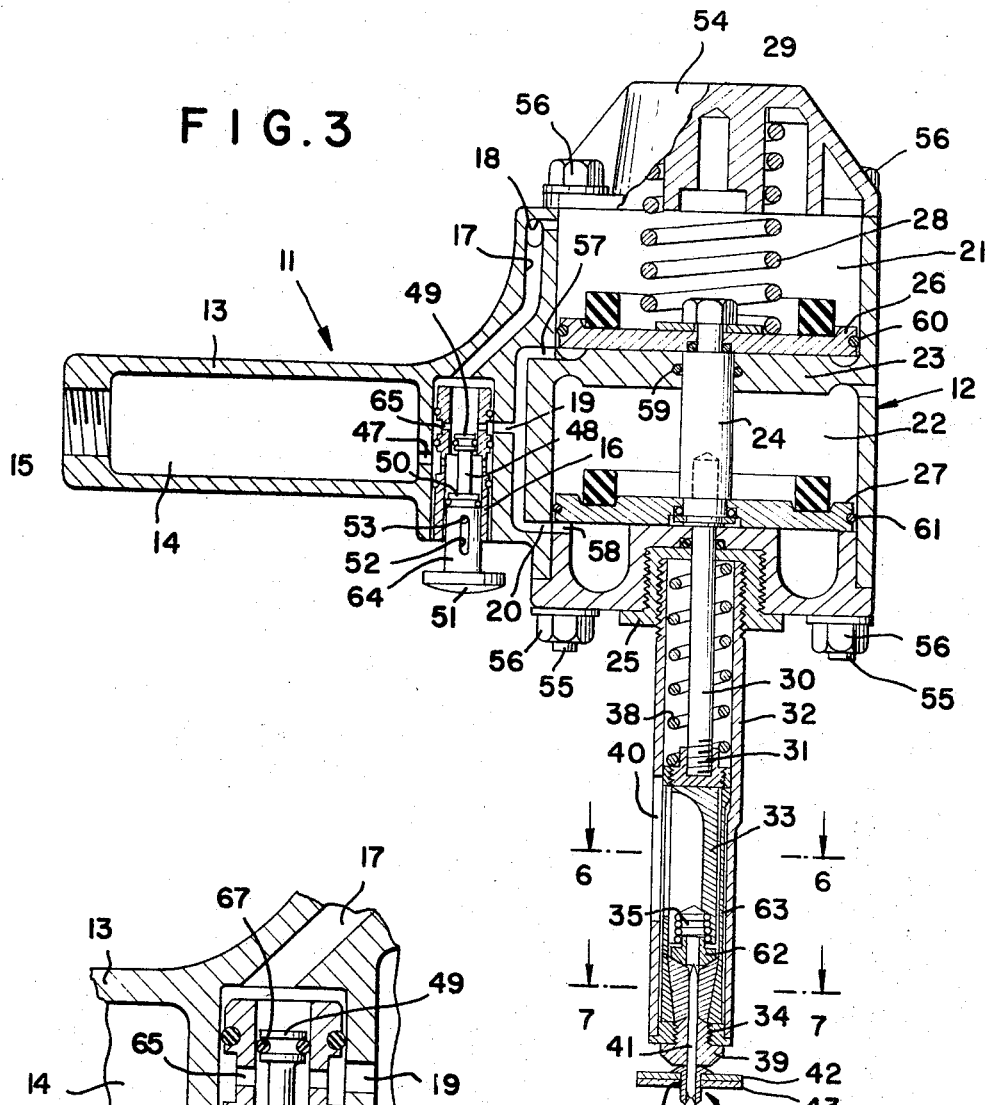
FIG. 3 is a cross-sectional view of the tool shown in FIG. 1 taken along lines 3—3 of FIG. 1. In this view the parts of the tool are in their normal rest position.
Figure 5:
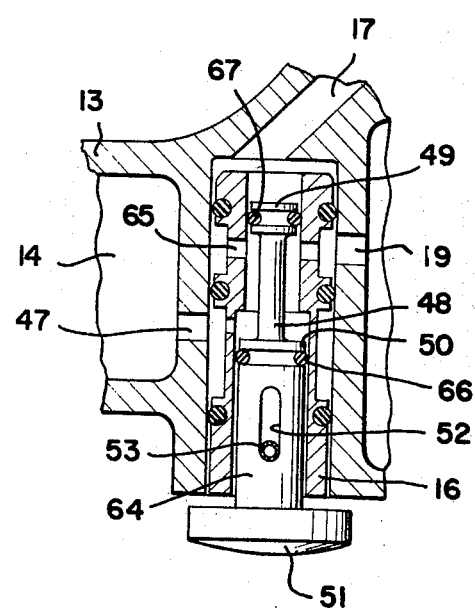
FIG. 5 is a detail cross-sectional view, on an enlarged scale, of the trigger and associated parts of the tool of this invention.

The position shown in FIG. 4 will be maintained so long as pressure is applied to trigger button 51. However, if this pressure is released, the pressure air within trigger housing 16 will exert a greater force on spool 50 than it will on spool 49 and will thus push spool 50 into a downward position. This movement will put spool 49 below conduit 65 and will thus permit conduit 65 to join conduit 17 thereby exhausting the pressure air contained within spaces 21 and 22 to atmosphere through portions 57–58, conduit 20, conduit 19, conduit 65, conduit 17 and opening 18. The pressure air will then be exhausted to atmosphere and springs 28 and 38 will push spools 26 and 27 into the "down" position thereby returning the tool to the normal rest position as shown in FIG. 3.

The foregoing sets forth the manner in which the objects of this invention are achieved.

I claim:

1. A rivet pulling tool comprising, in combination, a housing having a main portion, a rivet stem carrying portion, and a trigger carrying portion, a sleeve within said housing, a fluid actuated piston within said sleeve, said piston having a support member including a downwardly depending portion extending into said rivet stem carrying portion and a pair of spaced spools connected to said support member, a return spring connected to said piston and normally biasing said piston in non-actuated position, a pair of coacting rivet stem pulling jaws connected to said downwardly depending portion, spring means connected to said jaws normally biasing the same in closed position, a jam nut disposed beneath said jaws, a first pressure air supply channel connected to said trigger carrying portion, a second air carrying channel connected to each of the spools of said piston, each of said second air carrying channels being connected to one another and to said trigger carrying portion, a third channel connected to said trigger carrying portion and normally open to atmosphere, a trigger mechanism within said trigger carrying portion including a stem portion having a pair of spaced spool members thereupon, one of said spools being of larger diameter than the other of said spools, said smaller spool being adapted to alternatively block said pressure air supply channel or said third channel.

2. A rivet pulling tool as described in claim 1 including an additional spring surrounding said projecting portion of said piston support and biasing said support into downward position.

3. A rivet pulling tool as described in claim 2 including a handle secured to said housing provided with a pressure fluid container therewithin.

4. A rivet pulling tool as described in claim 3 wherein said rivet stem supporting housing is provided with a laterally disposed opening therewithin for ejection of a broken rivet stem.

References Cited

UNITED STATES PATENTS

| | | | |
|---|---|---|---|
| 3,088,618 | 5/1963 | Pickford | 72—391 |
| 3,095,106 | 6/1963 | Morrison | 72—391 |
| 3,196,662 | 7/1965 | Simmons | 72—391 |
| 3,263,481 | 8/1966 | Boyd | 72—453 |
| 3,323,346 | 6/1967 | Spangler | 72—453 |
| 3,363,445 | 1/1968 | Sanders | 72—391 |
| 3,451,248 | 6/1969 | Bell | 72—391 |
| 3,457,763 | 7/1969 | Freeman | 72—391 |

CHARLES W. LANHAM, Primary Examiner

G. P. CROSBY, Assistant Examiner

U.S. Cl. X.R.

72—453